(12) United States Patent
Susella (10) Patent No.: US 10,505,712 B2
(45) Date of Patent: Dec. 10, 2019

(54) PROTECTION OF A MODULAR REDUCTION CALCULATION

(71) Applicant: STMICROELECTRONICS S.r.l., Agrate Brianza (IT)

(72) Inventor: Ruggero Susella, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 188 days.

(21) Appl. No.: 15/827,994

(22) Filed: Nov. 30, 2017

(65) Prior Publication Data

US 2019/0165928 A1    May 30, 2019

(51) Int. Cl.
*H04L 9/00* (2006.01)
*G06F 7/72* (2006.01)
*G06F 21/44* (2013.01)
*G06F 21/72* (2013.01)

(52) U.S. Cl.
CPC ............... *H04L 9/005* (2013.01); *G06F 7/72* (2013.01); *G06F 7/725* (2013.01); *G06F 21/44* (2013.01); *G06F 21/72* (2013.01); *H04L 9/002* (2013.01)

(58) Field of Classification Search
CPC ........... H04L 9/005; H04L 9/002; G06F 7/72; G06F 21/72; G06F 7/725; G06F 21/44
See application file for complete search history.

(56) References Cited

U.S. PATENT DOCUMENTS

| 5,724,279 | A  | * | 3/1998 | Benaloh | G06F 7/72 708/491 |
| 8,417,760 | B2 | * | 4/2013 | Fischer | G06F 7/722 708/490 |
| 2007/0116270 | A1 | * | 5/2007 | Fischer | G06F 7/722 380/30 |
| 2015/0082047 | A1 | * | 3/2015 | Ozturk | H04L 9/3006 713/189 |

OTHER PUBLICATIONS

Bernstein et al., "Failures in NIST's ECC Standards, Section 6.3 : Reduction modulo the P-256 prime," Technische Universiteit Eindhoven, pp. 1, 13-14, 2016, downloaded from https://cr.yp.to/newelliptic/nistecc-20160106.pdf on Nov. 29, 2017.
Solinas, "Generalized Mersenne Numbers," National Security Agency, Ft. Meade, MD, 23 pages, 1999.

* cited by examiner

*Primary Examiner* — Nelson S. Giddins
(74) *Attorney, Agent, or Firm* — Seed IP Law Group LLP (57) ABSTRACT

A modular reduction calculation on a first number and a second number is protected from side-channel attacks, such as timing attacks. A first intermediate modular reduction result is calculated. A value corresponding to four times the first number is added to the first intermediate modular reduction result, generating a second intermediate modular reduction result. A value corresponding to the first number multiplied by a most significant word of the second intermediate modular reduction result plus 1, is subtracted from the second intermediate modular reduction result, generating (Continued)

a third intermediate modular reduction result. A cryptographic operation is performed using a result of the modular reduction calculation.

27 Claims, 6 Drawing Sheets

| xp | -x | -1 | x-1 | 0 | 0 | x | -x | x-1 |
|---|---|---|---|---|---|---|---|---|
| 2p | FFFFFFFE | FFFFFFFF | 00000001 | 00000000 | 00000000 | 00000002 | FFFFFFFE | 00000001 |
| 3p | FFFFFFFD | FFFFFFFF | 00000002 | 00000000 | 00000000 | 00000003 | FFFFFFFD | 00000002 |
| 4p | FFFFFFFC | FFFFFFFF | 00000003 | 00000000 | 00000000 | 00000004 | FFFFFFFC | 00000003 |

PROTECTION OF A MODULAR REDUCTION CALCULATION

BACKGROUND

Technical Field

The present disclosure generally relates to electronic circuits and, more specifically, to circuits executing modular reduction calculations. The present disclosure more specifically relates to the protection of such calculations against attacks aiming at discovering quantities manipulated by the calculations, such as timing attacks.

Description of the Related Art

In many applications, electronic circuits implement algorithms of scalar multiplication (e.g., cryptographic operations, such as encryption, decryption, authentication, signature calculation, etc., may employ scalar multiplication) and more generally algorithms manipulating data, called secret data, that is, the access to which is desired to be reserved to certain users or circuits. Among such algorithms, some use operations of multiplication by a scalar on elliptic curves (ECC), for example Elliptic Curve Digital Signature Algorithms (EC-DSA). Applications which may employ ECC algorithms include Transport Layer Security (TLS) protocols, USB-C protocols, Bluetooth Low-Energy (BLE) protocols, etc. The most-used elliptic curves are curves defined over NIST Primes, sometimes referred to herein as Solinas Primes. See Jerome A. Solinas, *Generalized Mersenne Numbers*, National Security Agency, USA (1999).

Electronic circuits may use various algorithms and sub-algorithms to implement ECC and ECDSA cryptographic operations. One of the subroutines that may be employed is modular reduction, which is typically one of the most called operations in an ECC or EC-DSA computation.

In addition, there are many ways to attempt discovering secret data manipulated by such calculations, which are often referred to as attacks. Among such attacks, timing attacks are side channel attacks in which the attacker analyzes the time taken to perform the cryptographic algorithms. If the time taken to perform the operation varies based on the input, an attacker may be able to use information regarding the time to deduce values of the secret data.

BRIEF SUMMARY

In an embodiment, a device comprises: one or more memories; and processing circuitry to perform a cryptographic operation, wherein the processing circuitry, in operation: performs a modular reduction calculation on a first number and a second number, the performing the modular reduction calculation including: calculating a first intermediate modular reduction result B; adding, to the first intermediate modular reduction result B, a first value corresponding to an integer multiple of the second number, generating a second intermediate modular reduction result B'; subtracting, from the second intermediate modular reduction result B', a second value corresponding to the second number multiplied by a most significant word m of the second intermediate modular reduction result B' plus 1, generating a third intermediate modular reduction result B"; and generating a result of the modular reduction calculation using the third intermediate modular reduction result B"; and uses the result of the modular reduction calculation in the cryptographic operation. In an embodiment, the generating the result of the modular reduction calculation using the third intermediate modular reduction result B" comprises: adding, word by word, a word of the third intermediate modular reduction result B" to a result of a logical AND of a respective word of the second number and a most significant word of the third intermediate modular reduction result B", generating a modular reduction value; and generating a result of the modular reduction calculation using the modular reduction value. In an embodiment, the processing circuitry performs the modular reduction calculation using a determined number of steps which is independent of the first number. In an embodiment, the first number represents an intermediate result of an elliptic curve group operation. In an embodiment, the performing the modular reduction calculation comprises performing a Solinas modular reduction. In an embodiment, the elliptic curve is an NIST P-256 curve. In an embodiment, the device comprises a Cortex-M0 processor and a USB-C interface. In an embodiment, the integer multiple is 4.

In an embodiment, a system comprises: one or more processing cores, which in operation, process digital data; and cryptographic circuitry, coupled to the one or more processing cores, wherein the cryptographic circuitry, in operation: performs a cryptographic operation by performing a modular reduction calculation using a first number and a second number, the performing the modular reduction calculation including: calculating a first intermediate modular reduction result B; adding, to the first intermediate modular reduction value B, a first value corresponding to an integer multiple of the second number, generating a second intermediate modular reduction result B'; and subtracting, from the second intermediate modular reduction result B', a second value corresponding to the second number multiplied by a most significant word m of the second intermediate modular reduction result B' plus 1, generating a third intermediate modular reduction result B". In an embodiment, the performing the modular reduction calculation includes: adding, word by word, a word of the third intermediate modular reduction result B" to a result of a logical AND of a respective word of the second number and a most significant word of the third intermediate modular reduction result B", generating a result of the modular reduction calculation. In an embodiment, the cryptographic circuitry performs the modular reduction calculation using a determined number of steps which is independent of the first number. In an embodiment, the first number represents an intermediate result of an elliptic curve group operation. In an embodiment, the performing the modular reduction calculation comprises performing a Solinas modular reduction. In an embodiment, the elliptic curve is an NIST P-256 curve. In an embodiment, the cryptographic circuitry comprises a Cortex-M0 processor and a USB-C interface. In an embodiment, the adding, to the first intermediate modular reduction value B, the first value corresponding to the integer multiple of the second number, comprises representing the first value in hexadecimal as 32-bit words corresponding to: −4, −1, −1, 3, 0, 0, 4, −4, 3. In an embodiment, the subtracting, from the second intermediate modular reduction result B', the second value corresponding to the second number multiplied by a most significant word m of the second intermediate modular reduction result B' plus 1 comprises determining:

$$(m+1)*p,$$

where m is the most significant word of B' and p is the second number. In an embodiment, the cryptographic circuitry, in operation, authenticates a device coupled to the USB-C interface, the authenticating including performing the cryptographic operation.

In an embodiment, a non-transitory computer-readable medium's contents cause one or more processing devices to perform a method, the method comprising: performing a cryptographic operation, the performing the cryptographic operation including performing a modular reduction calculation using a first number and a second number, the performing the modular reduction calculation including: calculating a first intermediate modular reduction result B; adding a value corresponding to an integer multiple of the second number to the first intermediate modular reduction result B, generating a second intermediate modular reduction result B'; subtracting, from the second intermediate modular reduction result B', a value corresponding to the second number multiplied by a most significant word m of the second intermediate modular reduction result B' plus 1, generating a third intermediate modular reduction result B"; and generating a result of the modular reduction calculation using the third intermediate modular reduction result B". In an embodiment, the integer multiple is 4. In an embodiment, the method comprises processing transaction data.

In an embodiment, a method comprises: performing, using cryptographic circuitry, a cryptographic operation, wherein the performing the cryptographic operation includes performing a modular reduction calculation on a first number and a second number, the performing the modular reduction calculation including: calculating a first intermediate modular reduction result B; adding, to the first intermediate modular reduction result B, a first value corresponding to an integer multiple of the second number, generating a second intermediate modular reduction result B'; subtracting, from the second intermediate modular reduction result B', a second value corresponding to the second number multiplied by a most significant word m of the second intermediate modular reduction result B' plus 1, generating a third intermediate modular reduction result B"; and generating a result of the modular reduction calculation using the third intermediate modular reduction result B". In an embodiment, the generating the result of the modular reduction calculation using the third intermediate modular reduction result B" comprises: adding, word by word, a word of the third intermediate modular reduction result B" to a result of a logical AND of a respective word of the second number and a most significant word of the third intermediate modular reduction result B", generating a modular reduction value; and generating a result of the modular reduction calculation using the modular reduction value. In an embodiment, the cryptographic circuitry performs the modular reduction calculation using a determined number of steps which is independent of the first number. In an embodiment, the first number represents an intermediate result of an elliptic curve group operation. In an embodiment, the integer multiple is 4. In an embodiment, the method comprises: authenticating a device coupled to the cryptographic circuitry, the authenticating including performing the cryptographic operation; and enabling operation of the device based on the authenticating.

DETAILED DESCRIPTION

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, cryptographic circuits, such as transistors, multipliers, transmitters, adders, comparators, integrated circuits, logic gates, memories, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Figure 1:
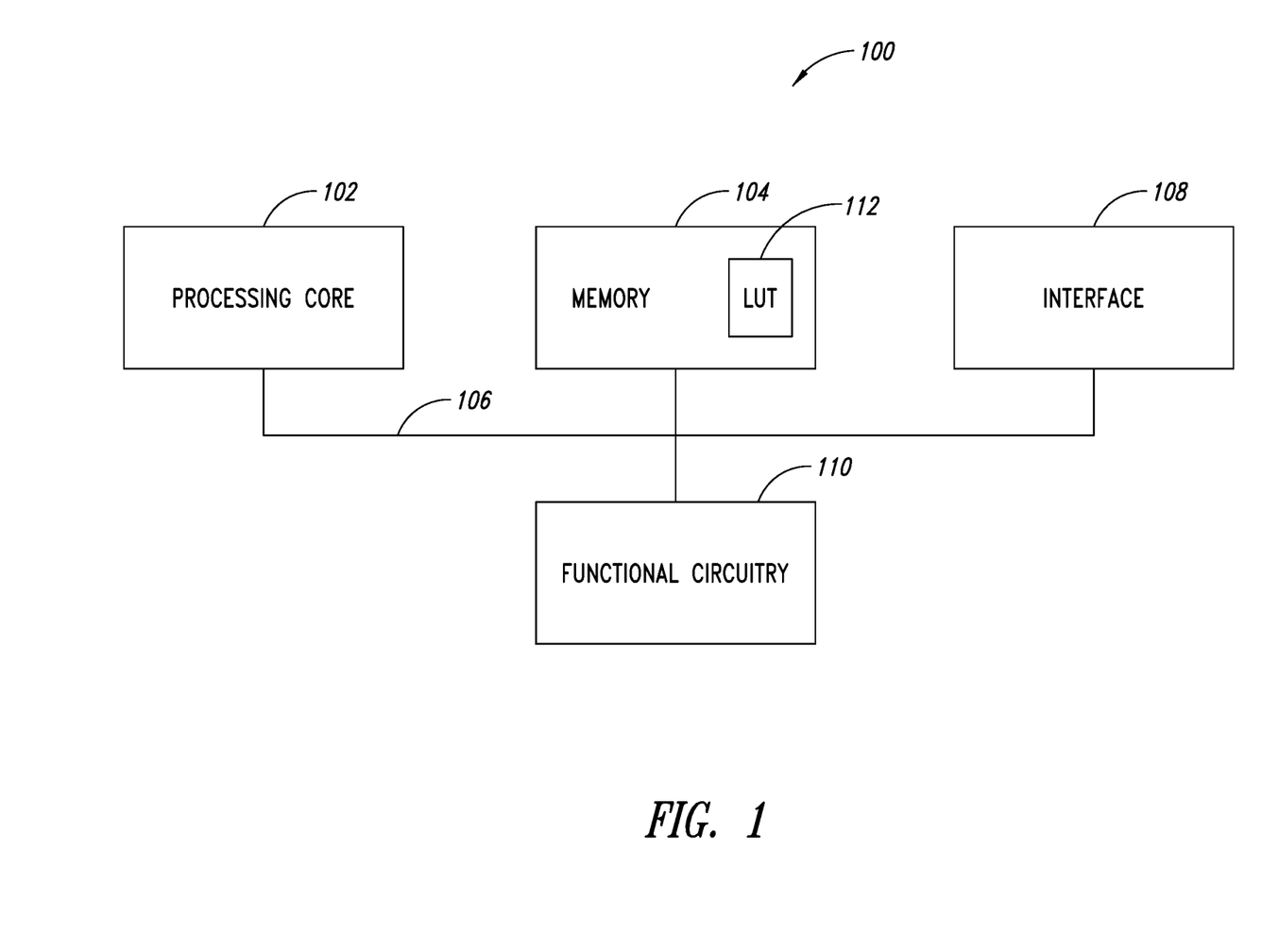
FIG. 1 schematically shows an embodiment of an electronic device.

FIG. 1 schematically illustrates an embodiment of an electronic circuit or device 100 of the type to which the embodiments which will be described may apply. The device 100 comprises a processing core or circuit 102. The processing core may comprise, for example, one or more processors, a state machine, a microprocessor, a programmable logic circuit, discrete circuitry, logic gates, etc., and various combinations thereof. The device 100 includes one or more memories 104, such as one or more volatile and/or non-volatile memories which may store, for example, all or part of data and keys related to cryptographic operations. The memory 104 may include one or more lookup tables 112, which may store, for example, values used to perform modular reduction calculations. The device 100 includes one or more data, address and/or control buses 106 coupled to the various components of the device 100, and one or more interfaces 108, such as a USB-C interface, which in operation couples the device 100 to external devices and systems.

The one or more interfaces 108 may be wired or wireless, or various combinations thereof. The device 100 may include other functional circuits FCT 110, which, in operation, may perform various functions of the device 100. The device 100 may comprise, for example, a processor employing a small multiplier, such as the Cortex-M0 processor which has a 16×16 multiplier.

Figure 2:
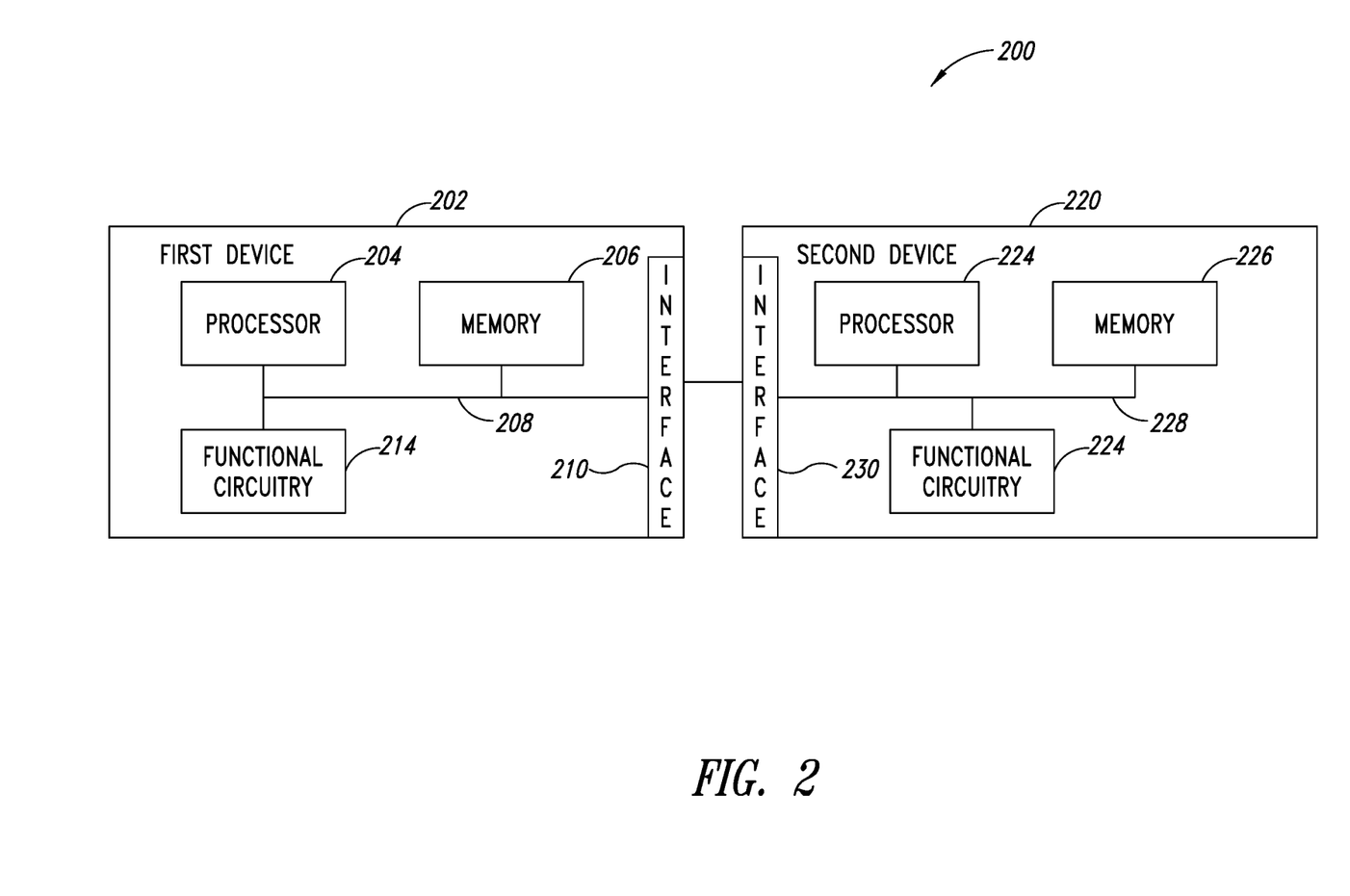
FIG. 2 schematically shows an embodiment of a system including an electronic device.

FIG. 2 schematically illustrates an embodiment of a system 200, of the type to which the embodiments which will be described may apply. The system 200 comprises a first device 202, which as illustrated includes a processing core or circuit 204. The processing core 204 may comprise, for example, one or more processors, a state machine, a microprocessor, a programmable logic circuit, discrete circuitry, etc., and various combinations thereof. The first device 202 includes one or more memories 206, such as one or more volatile and/or non-volatile memories which may store, for example, all or part of data and keys related to cryptographic operations. The first device 202 includes one or more data, address and/or control buses 208 coupled to the various components of the first device 202, and one or more interfaces 210, such as a USB-C interface, which in operation couples the first device 202 to other devices and systems, such as second device 220, which may be, for example, a peripheral device which needs to be authenticated by the first device 202 before allowing the second device 220 to have access to the memory 206, or to other functional circuits FCT 214 of the first device 202. The other function circuits 214 of the device 202 may, in operation, perform various functions of the device 202. The one or more interfaces 210 may be wired or wireless, or various combinations thereof.

The second device 220, as illustrated includes a processing core or circuit 224. The processing core 224 may comprise, for example, one or more processors, a state machine, a microprocessor, a programmable logic circuit, discrete circuitry, etc., and various combinations thereof. The second device 220 includes one or more memories 226, such as one or more volatile and/or non-volatile memories which may store, for example, data and instructions related to the functions of the second device 226, such as a device ID, which may be encrypted. The device 220 includes one or more data, address and/or control buses 228 coupled to the various components of the device 220, and one or more interfaces 230, such as a USB-C interface, which in operation couples the second device 220 to other devices and systems, such as first device 202. The second device 220 includes functional circuitry which may perform various functions of the second device 220. The one or more interfaces 230 may be wired or wireless, or various combinations thereof. As illustrated, the second device 220 is communicatively coupled to the first device 202.

Operations of scalar multiplication are used for calculations on elliptic curves, which form one category of cryptographic operation algorithms. A scalar multiplication comprises calculating result C of the multiplication of a point P of an elliptic curve G by an integer d (scalar), that is, applying formula:

$$C=dP.$$

Scalar multiplication is the function upon which elliptic curve cryptography is based. The most commonly used elliptic curve is the NIST P-256 curve. The scalar multiplication on an elliptic curve by an electronic circuit (a state machine, a processor executing the method in the form of a program, a programmable logic circuit, etc.), for example, device 100 or device 202, is often performed using a Montgomery reduction method. Inexpensive processors, such as a Cortex-M0 processor, and other processors may perform scalar multiplication using modular reduction algorithms, such as Solinas Modular Reduction, which is typically less computationally expensive than using a Montgomery reduction method. See, Jerome A. Solinas, *Generalized Mersenne Numbers*, National Security Agency, USA (1999), which describes the Solinas Modular Reduction. As mentioned, the most commonly used elliptic curves are P-256 curves, which are defined over a special prime number which allows a fast modular reduction. Other curves which might be of interest include, for example, the NIST P-384, P-224 and P-192. The Solinas Modular Reduction terminates by adding or subtracting a few copies of the prime number. The number of additions or subtractions may vary based on the input. Thus, the Solinas Modular Reduction does not have a constant run time. This means cryptographic operations employing a Solinas Modular Reduction may be subject to timing attacks to detect secret information, such as the secret keys and the secret data. For example, a user can collect different execution times and infer the value of a secret key.

Assume the modular reduction calculation to be performed is:

$$C=A \bmod p, \text{ with } 0<A<p^2 \qquad \text{(Equation 1)}$$

where p is the Solinas or NIST P-256 prime:

$$p=2^{256}-2^{224}+2^{192}+2^{96}-1 \qquad \text{(Equation 2)}$$

The Solinas prime p may be represented in Hex as:

$$p=FFFFFFFF\ FFFFFFFF\ FFFFFFFF\ 00000000$$
$$00000000\ 00000000\ 00000001\ FFFFFFFF \qquad \text{(Equation 3)}$$

According to Solinas, every integer A can be written in 32-bit words as $A_{15}\|\ldots\|A_0$. Defining B as follows:

$$B=T+2S_1+2S_2+S_3+S_4-D_1-D_2-D_3-D_4 \qquad \text{(Equation 4)}$$

with $$T=(A_7\|A_6\|A_5\|A_4\|A_3\|A_2\|A_1\|A_0) \qquad \text{(Equation 5)}$$

$$S_1=(A_{15}\|A_{14}\|A_{13}\|A_{12}\|A_{11}\|0\|0\|0) \qquad \text{(Equation 6)}$$

$$S_2+(0\|A_{15}\|A_{14}\|A_{13}\|A_{12}\|0\|0\|0) \qquad \text{(Equation 7)}$$

$$S_3=(A_{15}\|A_{14}\|0\|0\|0\|A_{10}\|A_9\|A_8) \qquad \text{(Equation 8)}$$

$$S_4=(A_8\|A_{13}\|A_{15}\|A_{14}\|A_{13}\|A_{11}\|A_{10}\|A_9) \qquad \text{(Equation 9)}$$

$$D_1=(A_{10}\|A_8\|0\|0\|0\|A_{13}\|A_{12}\|A_{11}) \qquad \text{(Equation 10)}$$

$$D_2=(A_{11}\|A_9\|0\|0\|A_{15}\|A_{14}\|A_{13}\|A_{12}) \qquad \text{(Equation 11)}$$

$$D_3=(A_{12}\|0\|A_{10}\|A_9\|A_8\|A_{15}\|A_{14}\|A_{13}) \qquad \text{(Equation 12)}$$

$$D_4=(A_{13}\|0\|A_{11}\|A_{10}\|A_9\|0\|A_{15}\|A_{14}) \qquad \text{(Equation 13)}$$

Then:

$$C=A \bmod p=B, \text{ adding or subtracting a few copies of } p. \qquad \text{(Equation 14)}.$$

If a different Solinas or NIST prime is used in equation 1 (e.g., NIST P-384), the expressions for p, B and the terms of B would be different. See Solinas, referenced above, Appendix 1, examples 1-4.

The idea behind Solinas Modular Reduction is to obtain an almost complete reduction using only big integer additions or subtractions, instead of multiplications. See, Equation 4. However, B is not completely reduced, it is an intermediate modular reduction result or value. Additional processing is performed to obtain a complete reduction. Solinas does not specify the additional processing. In practice, high-end processors typically use a different modular reduction process (e.g., Montgomery's reduction), so there is no need to specify the remaining processes of a Solinas reduction. Many processors employing a Solinas reduction (typically low-end processors) use a loop which adds or subtracts p until 0<B<p. However, this is not a constant time process (e.g., the number of processing steps depends on the number A).

Bernstein suggests the following algorithm:
1. Conditionally add 4p;
2. Conditionally add 2p;
3. Conditionally add p;
4. Conditionally subtract 4p;
5. Conditionally subtract 2p;
6. Conditionally subtract p.

See, Bernstein et al., *Failures in NIST's ECC standards*, Section 6.3, Tech. Univ. Eindhoven, The Netherlands (2016). In Bernstein's algorithm, conditionally means 0 might be added or subtracted instead. Bernstein's algorithm requires computing (or reading from a table) 4p, 2p and p, and performs three additions, three subtractions, and several comparisons to achieve constant time. Thus, Bernstein's algorithm also may be computationally expensive.

It can be shown that:

$$-4p < B < 5p \quad \text{(Equation 15)}$$

In an embodiment, $$B' = B + 4p \quad \text{(Equation 16)}$$

is computed, where B' is a second intermediate modular reduction result corresponding to the first intermediate modular reduction result plus an integer multiple of the second number p. In equation 16, the integer multiple is 4, but other integer multiples may be added in some embodiments. Then, in the embodiment of equation 16:

$$0 < B' < 9p \quad \text{(Equation 17)}.$$

By looking at the most significant word (MSW) of B', B' can be bound as follows:

$$m^*p < B' < (m+2)^*p \quad \text{(Equation 18)}$$

where m is the most significant word (MSW) of B'. Then, $$B'' = B' - (m+1)^*p \quad \text{(Equation 19)}$$

is computed (as discussed below, the multiplication can be avoided), where B'' is a third intermediate modular reduction result, and now $$-p < B'' < p. \quad \text{(Equation 20)}.$$

It follows as a consequence that:

If $B'' < 0$, then $MSW(B'') = 0xFFFFFFFF$ (Equation 21)

If $B'' \geq 0$, then $MSW(B'') = 0$. (Equation 22)

Then, C[i] is computed word by word as follows:

$$C[i] = B''[i] + (p[i] \text{ AND } MSW(B'')) \quad \text{(Equation 23)}$$

where C[i] is a modular reduction value.

If MSW(B'')=0, then zero is being added to B'', and if MSW(B'')=0xFFFFFFFF, then p is being added to B'', and a determined number of operations is performed independent of the input (e.g., independent of the value A). In an embodiment, the additional cost of using a determined number of steps to calculate the Solinas reduction is three additions and one AND operation. Some embodiments may add one or more dummy operations (e.g., each time the algorithm is executed, randomly, etc), to facilitate preventing a side channel attack from determining the determined number of operations (e.g., from deducing information about how the modular reduction is being performed), while still keeping the number of operations independent of the value of A. Some embodiments may perform the multiplication instead of representing a result of the multiplication in hexadecimal as discussed below.

In some embodiments, different relationships may be employed. For example, in equation 15, a relationship between −5p, B and 6p may be employed. In some embodiments, in equation 16, a different multiple of p may be added (e.g., 5p or 6p), etc. The relationship and the multiple may be selected based on the curve employed, such as the NIST P-384 curve, and selected, for example, in order to reduce use of computational resources.

Figure 3:
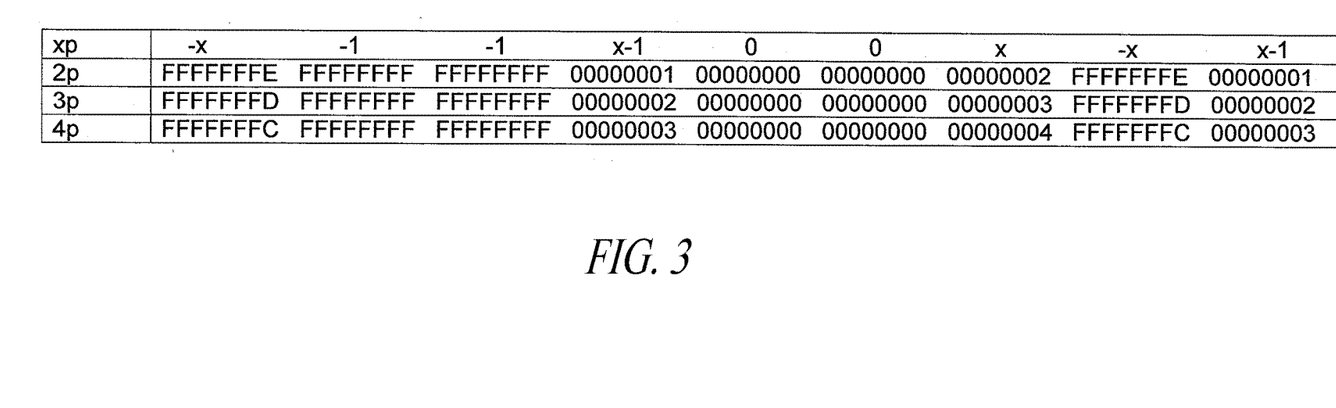
FIG. 3 illustrates example representations of a Solinas or NIST prime multiplied by an integer in hexadecimal.

As mentioned above, the costs of the multiplication of Equation 19 can be avoided or reduced. The component x*p can be written using only −x, −1, 0, x and x−1. For example, FIG. 3 illustrates representations of 2p, 3p, 4p and xp using −x, −1, 0, x and x−1. In an embodiment, −x, x and x−1 are constructed at runtime based on x, and together with the constants are used to generate x*p. This may facilitate avoiding timing issues due to non-constant time behavior of caches. In an embodiment, these representations also may be stored in a lookup table, and retrieved, for example, based on the value of m+1. If a different curve is used (e.g., NIST P-384), x*p can be represented other ways (e.g., 0, −1, −x, x−1, and −x−1), and the representations may be different than those shown in FIG. 3.

As mentioned above, other Solinas or NIST primes may be employed in an embodiment. For example, assume the modular reduction calculation to be performed is:

$$C = A \bmod p, \text{ with } 0 < A < p^2 \quad \text{(Equation 1A)}$$

where p is the Solinas or NIST P-384 prime:

$$p = 2^{384} - 2^{128} - 2^{96} + 2^{32} - 1. \quad \text{(Equation 2A)}$$

The Solinas prime p may be represented in Hex as:

$$p = \textit{FFFFFFFF } 00000000 \ 00000000 \ \textit{FFFFFFFF}$$
$$\textit{FFFFFFFE FFFFFFFF FFFFFFFF}$$
$$\textit{FFFFFFFF FFFFFFFF FFFFFFFF}$$
$$\textit{FFFFFFFF FFFFFFFF} \quad \text{(Equation 3A)}$$

According to Solinas, every integer A can be written in 32-bit words as $A_{23} \| \ldots \| A_0$. Defining B as follows:

$$B = T + 2S_1 + S_2 + S_3 + S_4 + S_5 + S_6 - D_1 - D_2 - D_3 \quad \text{(Equation 4A)}$$

with $$T = (A_{11} \| A_{10} \| A_9 \| A_8 \| A_7 \| A_6 \| A_5 \| A_4 \| A_3 \| A_2 \| A_1 \| A_0) \quad \text{(Equation 5A)}$$

$$S_1 = (0 \| 0 \| 0 \| 0 \| 0 \| A_{23} \| A_{22} \| A_{21} \| 0 \| 0 \| 0 \| 0) \quad \text{(Equation 6A)}$$

$$S_2 = (A_{23} \| A_{22} \| A_{21} \| A_{20} \| A_{19} \| A_{18} \| A_{17} \| A_{16} \| A_{15} \| A_{14} \| A_{13} \| A_{12}) \quad \text{(Equation 7A)}$$

$$S_3 = (A_{20} \| A_{19} \| A_{18} \| A_{17} \| A_{16} \| A_{15} \| A_{14} \| A_{13} \| A_{12} \| A_{23} \| A_{22} \| A_{21}) \quad \text{(Equation 8A)}$$

$$S_4 = (A_{19} \| A_{18} \| A_{17} \| A_{16} \| A_{15} \| A_{14} \| A_{13} \| A_{12} \| A_{20} \| 0 \| A_{23} \|) \quad \text{(Equation 9A)}$$

$$S_5 = (0 \| 0 \| 0 \| 0 \| A_{23} \| A_{22} \| A_{21} \| A_2 \| 0 \| 0 \| 0 \| 0) \quad \text{(Equation 10A)}$$

$$S_6 = (0 \| 0 \| 0 \| 0 \| 0 \| 0 \| A_{23} \| A_{22} \| A_{21} \| 0 \| 0 \| A_{20}) \quad \text{(Equation 11A)}$$

$$D_1 = (A_{22}\|A_{21}\|A_{20}\|A_{19}\|A_{18}\|A_{17}\|A_{16}\|A_{15}\|A_{14}\|A_{13}\|A_{12}\|A_{23}) \quad \text{(Equation 12A)}$$

$$D_2 = (0\|0\|0\|0\|0\|0\|0\|A_{23}\|A_{22}\|A_{21}\|A_{20}\|0) \quad \text{(Equation 13A)}$$

$$D_3 = (0\|0\|0\|0\|0\|0\|0\|A_{23}\|A_{23}\|0\|0\|0) \quad \text{(Equation 14A)}$$

Then:

$$C = A \bmod p = B, \text{ adding or subtracting a few copies of } p. \quad \text{(Equation 15A)}$$

It can be shown that:

$$-2p < B < 6p \quad \text{(Equation 16A)}$$

In an embodiment, $$B' = B + 2p \quad \text{(Equation 17A)}$$

is computed, where B' is a second intermediate modular reduction result corresponding to the first intermediate modular reduction result plus an integer multiple of the second number p. In equation 17A, the integer multiple is 2, but other integer multiples may be added in some embodiments. Then, in the embodiment of equation 17A:

$$0 < B' < 8p \quad \text{(Equation 18A)}$$

By looking at the most significant word (MSW) of B', B' can be bound as follows:

$$m*p < B' < (m+2)*p \quad \text{(Equation 19A)}$$

where m is the most significant word (MSW) of B'.
Then, $$B'' = B' - (m+1)*p \quad \text{(Equation 20A)},$$

is computed (as discussed above, the multiplication can be avoided), where B'' is a third intermediate modular reduction result, and now $$-p < B'' < p. \quad \text{(Equation 21A)}$$

It follows as a consequence that:

If $B'' < 0$, then MSW($B''$) = 0xFFFFFFFF    (Equation 22A)

If $B'' \geq 0$, then MSW($B''$) = 0.    (Equation 23A)

Then, C[i] is computed word by word as follows:

$$C[i] = B''[i] + (p[i] \text{ AND MSW}(B'')) \quad \text{(Equation 24A)}$$

where C[i] is a modular reduction value.
With reference to equation 20A, x*p can be written as:

$$x*p = -x, x-1, 0, -x, -(x+1), -1, -1, -1, -1, -1, -1, x-1 \quad \text{Equation 25A}$$

Figure 4:
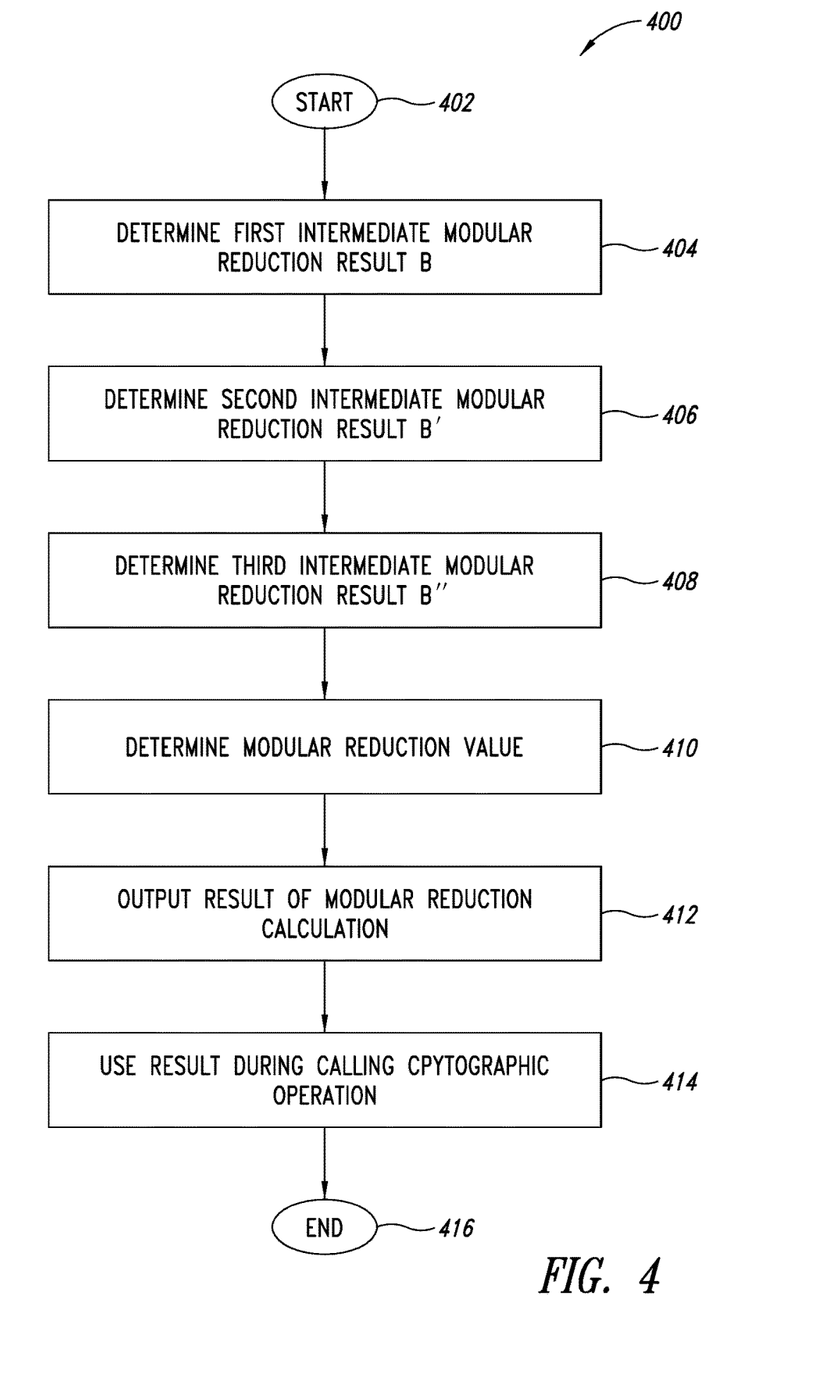
FIG. 4 illustrates an embodiment of a method of performing a modular reduction calculation.

FIG. 4 illustrates an embodiment of a method 400 of performing a modular reduction calculation employing a first number (e.g., A) and a second number (e.g., a Solinas prime p), which may be employed, for example, by an embodiment of a device, such as the device 100 of FIG. 1, or by an embodiment of a system, such as the system 200 of FIG. 2, where the number of operations to perform the modular reduction calculation is independent of the first number. The method begins at 402, for example, when a cryptographic operation initiates a modular reduction calculation as part of performing the cryptographic operation, and proceeds to 404. A cryptographic operation performing a scalar multiplication over a P-256 prime may typically perform approximately 5000 modular reductions during the performance of the scalar multiplication.

At 404, a first intermediate modular reduction result B is determined from a first input number A. This may be done, for example, by applying equations 4-13. In some embodiments, other equations may be used to determine the first intermediate modular reduction result B. For example, the equations employed for examples 1, 2 and 4 of the Solinas reference discussed above may be used when the prime is an NIST P-192, P-224 or P-384 (e.g., equations 4A to 14A when the prime is NIST P-384). The method proceeds from 404 to 406.

At 406, a second intermediate modular reduction result B' is determined based on the first intermediate reduction result B and a second input number p. This may be done, for example, by applying equation 16 or equation 17A. In some embodiments, a different integer multiple other than 4 may be employed in equation 16 and a different integer multiple other than 2 may be employed in equation 17A. For example, the equation B'=B+5p may be employed in some embodiments. The method proceeds from 406 to 408.

At 408, a third intermediate modular reduction result B'' is determined based on the second intermediate reduction result B' and the second input number p. This may be done, for example, by applying equation 19 or equation 20A. The method proceeds from 408 to 410.

At 410, a modular reduction value is determined based on the third intermediate reduction result B'' and the second input number p. This may be done, for example, by applying equation 23 or equation 24A. The method proceeds from 410 to 412.

At 412, a result of the modular reduction calculation is generated based on the modular reduction value. In an embodiment, the result of the modular reduction calculation is equal to the modular reduction value. The method proceeds from 412 to 414.

At 414, the result of the modular reduction calculation is used in the performance of a cryptographic operation, such as during a scalar multiplication performed as part of the performance of the cryptographic operation. The result of the scalar multiplication or the cryptographic operation might be used, e.g., to authenticate a device associated with the number A, to encrypt or decrypt the number A, etc. The method proceeds from 414 to 416, where the method 400 may stop or further processing may occur.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, data structures (e.g., a lookup table; etc.) may be structured in various manners in other embodiments, such as by having a single data structure split into multiple data structures or by having multiple data structures consolidated into a single data structure, and may store more or less information than is described (e.g., when other data structures instead lack or include such information respectively, or when the amount or types of information that is stored is altered).

Embodiments of methods of performing an cryptographic operation may contain additional acts not shown in FIG. 4, may not contain all of the acts shown in FIG. 4, may perform acts shown in FIG. 4 in various orders, and may be modified in various respects. For example, error processing may be performed if a cryptographic operation to authenticate a device indicates the device is not authenticated.

In an embodiment, a constant-time implementation of the last portion of a Solinas reduction on a processor, such as a Cortex-M0, is facilitated which is faster than conventional constant time implementations and which avoids conditional branches.

Figure 5:
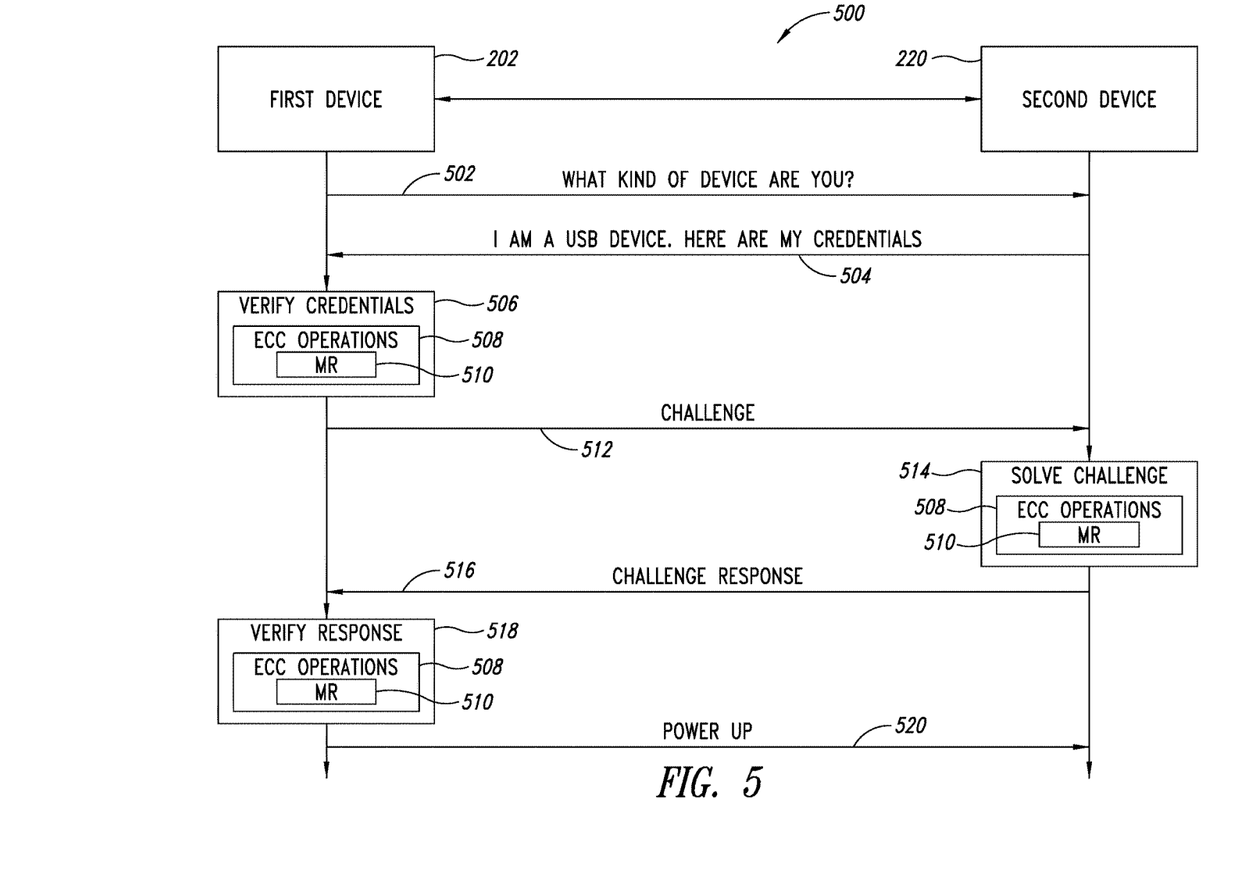
FIG. 5 illustrates an embodiment of a method of authenticating a USB device.

FIG. 5 illustrates an embodiment of a method 500 of authenticating a device, such as a USB device, which may employ a Solinas reduction algorithm, such as an embodiment of the method 400 illustrated in FIG. 4. With reference to FIG. 2, a first device 202 (e.g., a computer) is communicatively coupled to a second device 220 (e.g., a USB device such as a cell phone, a smart card, etc.), for example via a USB cable.

At 502, the first device 202 sends a message to the second device 220 requesting identification information (e.g., requesting identification of a device type and credentials). The second device 220 responds at 504 by identifying itself as a USB device and providing its credentials.

At 506, the first device 202 attempts to verify the credentials. As illustrated, verifying the credentials includes performing one or more Elliptic Curve Cryptography (ECC) operations 508, each of which may involve one or more modular reduction operations 510, which may be performed using an embodiment of the methods described herein, such as an embodiment of FIG. 4.

When the credentials are verified, the first device 202 proceeds to 512, where the first device 202 sends a challenge to the second device 220.

At 514, the second device 220 attempts to solve the challenge. As illustrated, solving the challenge includes performing one or more Elliptic Curve Cryptography (ECC) operations 508, each of which may involve one or more modular reduction operations 510, which may be performed using an embodiment of the methods described herein, such as an embodiment of FIG. 4.

When the challenge is solved, the second device 220 proceeds to 516, where the second device 222 sends a challenge response to the first device 202.

At 518, the first device 202 attempts to verify the challenge response. As illustrated, verifying the challenge response includes performing one or more Elliptic Curve Cryptography (ECC) operations 508, each of which may involve one or more modular reduction operations 510, which may be performed using an embodiment of the methods described herein, such as an embodiment of FIG. 4.

When the challenge response is verified, the first device 202 proceeds to 520, where the first device 202 may take one or more actions in response to verification of the challenge response, such as authenticating the second device 220, powering up the second device 220, enabling data transfers, etc., and various combinations thereof When the challenge response is not verified, the first device may take one or more action based on the failure of the verification, such as resetting itself, disabling communications with the second device, etc., and various combinations thereof.

Embodiments of methods of authenticating a device may contain additional acts not shown in FIG. 5, may not contain all of the acts shown in FIG. 5, may perform acts shown in FIG. 5 in various orders, and may be modified in various respects. For example, error processing may be performed if a cryptographic operation to authenticate a device indicates the device is not authenticated. In another example, one or more of the ECC operations may include other sub-operations in addition to modular reduction operations.

Figure 6:
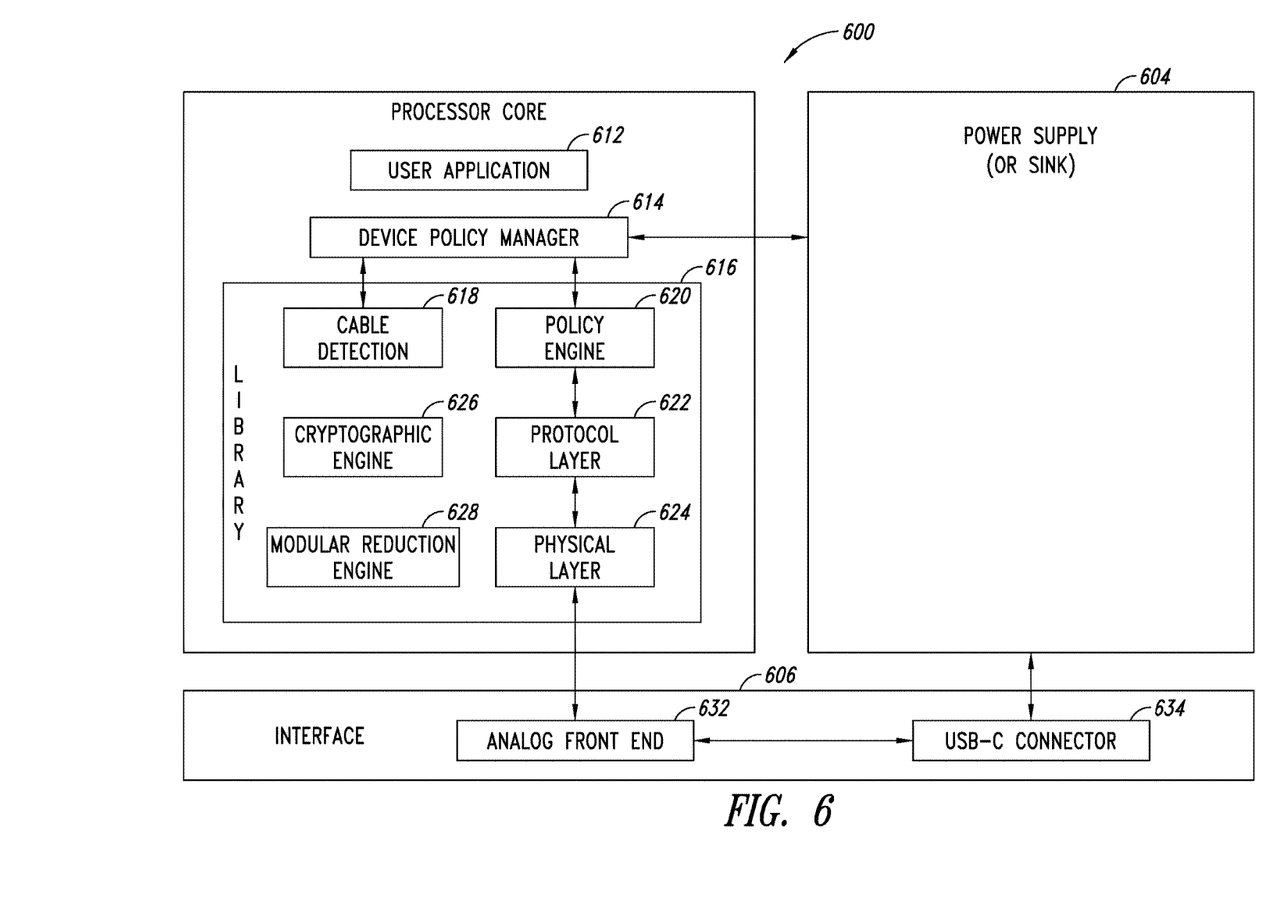
FIG. 6 illustrates an embodiment of an electronic device.

FIG. 6 illustrates an embodiment of a device 600 that may employ one or more embodiments of the methods disclosed herein. The device 600 includes a processor core 602, a power supply/sink 604, which may comprise an external power supply or may couple to an external power supply, and an interface 606, such as a USB-C interface, which as illustrated includes an analog front end 632 and a USB-C connector 634. The device 602 may authenticate a second device (see device 220 of FIG. 2), for example, using an embodiment of FIG. 5. Based on the authentication, the processor core 602 may generate control signals to enable the power supply/sink 604 to exchange power with a second device coupled to the interface 606.

As illustrated, the processor core implements one or more user applications 612 and one or more device policy managers 614. The processor core includes a library 616 to implement one or more functions of the processor core 602, such as one or more functions of a user application 612, a device policy manager 614, etc. As illustrated, the library includes a cable detection block or circuit 618, a policy engine block or circuit 620, a protocol layer block or circuit 622, a physical layer block or circuit 624, a cryptographic engine block or circuit 626 and a modular reduction engine block or circuit 628. While the various blocks or circuits are shown as separate blocks or circuits, the various blocks or circuits may be combined or separated into additional blocks in some embodiments. For example, the cryptographic engine may include the modular reduction engine. The various blocks may be implemented in hardware or software or various combinations thereof. For example, in an embodiment, the device 600 may implement an embodiment of a method described herein (such as an embodiment of FIG. 4 or an embodiment of FIG. 5) by calling a software routine (e.g., a modular reduction routine) embedded in the library 616 of the processor core 602.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
one or more memories; and
processing circuitry to perform a cryptographic operation, wherein the processing circuitry, in operation:
performs a modular reduction calculation on a first number and a second number, the performing the modular reduction calculation including:
calculating a first intermediate modular reduction result B;
adding, to the first intermediate modular reduction result B, a first value corresponding to an integer multiple of the second number, generating a second intermediate modular reduction result B';
subtracting, from the second intermediate modular reduction result B', a second value corresponding to the second number multiplied by a most significant word m of the second intermediate modular reduction result B' plus 1, generating a third intermediate modular reduction result B"; and
generating a result of the modular reduction calculation using the third intermediate modular reduction result B"; and
uses the result of the modular reduction calculation in the cryptographic operation.

2. The device of claim 1, wherein the generating the result of the modular reduction calculation using the third intermediate modular reduction result B" comprises:
adding, word by word, a word of the third intermediate modular reduction result B" to a result of a logical AND of a respective word of the second number and a most significant word of the third intermediate modular reduction result B", generating a modular reduction value; and
generating a result of the modular reduction calculation using the modular reduction value.

3. The device of claim 1 wherein the processing circuitry performs the modular reduction calculation using a determined number of steps which is independent of the first number.

4. The device of claim 1 wherein the first number represents an intermediate result of an elliptic curve group operation.

5. The device of claim 4 wherein the performing the modular reduction calculation comprises performing a Solinas modular reduction.

6. The device of claim 5 wherein the elliptic curve is an NIST P-256 curve.

7. The device of claim 1, comprising a Cortex-M0 processor and a USB-C interface.

8. The device of claim 1 wherein the integer multiple is 4.

9. A system, comprising:
one or more processing cores, which in operation, process digital data; and
cryptographic circuitry, coupled to the one or more processing cores, wherein the cryptographic circuitry, in operation:
performs a cryptographic operation by performing a modular reduction calculation using a first number and a second number, the performing the modular reduction calculation including:
calculating a first intermediate modular reduction result B;
adding, to the first intermediate modular reduction value B, a first value corresponding to an integer multiple of the second number, generating a second intermediate modular reduction result B'; and
subtracting, from the second intermediate modular reduction result B', a second value corresponding to the second number multiplied by a most significant word m of the second intermediate modular reduction result B' plus 1, generating a third intermediate modular reduction result B".

10. The system of claim 9 wherein the performing the modular reduction calculation includes:
adding, word by word, a word of the third intermediate modular reduction result B" to a result of a logical AND of a respective word of the second number and a most significant word of the third intermediate modular reduction result B", generating a result of the modular reduction calculation.

11. The system of claim 9 wherein the cryptographic circuitry performs the modular reduction calculation using a determined number of steps which is independent of the first number.

12. The system of claim 11 wherein the first number represents an intermediate result of an elliptic curve group operation.

13. The system of claim 9 wherein the performing the modular reduction calculation comprises performing a Solinas modular reduction.

14. The system of claim 12 wherein the elliptic curve is an NIST P-256 curve.

15. The system of claim 9 wherein the cryptographic circuitry comprises a Cortex-M0 processor and a USB-C interface.

16. The system of claim 9 wherein the adding, to the first intermediate modular reduction value B, the first value corresponding to the integer multiple of the second number, comprises representing the first value in hexadecimal as 32-bit words corresponding to:
−4, −1, −1, 3, 0, 0, 4, −4, 3.

17. The system of claim 9 wherein the subtracting, from the second intermediate modular reduction result B', the second value corresponding to the second number multiplied by a most significant word m of the second intermediate modular reduction result B' plus 1 comprises determining:

$(m+1)*p,$ where m is the most significant word of B' and p is the second number.

18. The system of claim 15 wherein the cryptographic circuitry, in operation, authenticates a device coupled to the USB-C interface, the authenticating including performing the cryptographic operation.

19. A non-transitory computer-readable medium having contents which cause one or more processing devices to perform a method, the method comprising:
performing a cryptographic operation, the performing the cryptographic operation including performing a modular reduction calculation using a first number and a second number, the performing the modular reduction calculation including:
calculating a first intermediate modular reduction result B;
adding a value corresponding to an integer multiple of the second number to the first intermediate modular reduction result B, generating a second intermediate modular reduction result B';

subtracting, from the second intermediate modular reduction result B', a value corresponding to the second number multiplied by a most significant word m of the second intermediate modular reduction result B' plus 1, generating a third intermediate modular reduction result B"; and generating a result of the modular reduction calculation using the third intermediate modular reduction result B".

20. The non-transitory computer-readable medium of claim 19 wherein the integer multiple is 4.

21. The non-transitory computer-readable medium of claim 19 wherein the method comprises processing transaction data.

22. A method, comprising:
performing, using cryptographic circuitry, a cryptographic operation, wherein the performing the cryptographic operation includes performing a modular reduction calculation on a first number and a second number, the performing the modular reduction calculation including:
calculating a first intermediate modular reduction result B;
adding, to the first intermediate modular reduction result B, a first value corresponding to an integer multiple of the second number, generating a second intermediate modular reduction result B';
subtracting, from the second intermediate modular reduction result B', a second value corresponding to the second number multiplied by a most significant word m of the second intermediate modular reduction result B' plus 1, generating a third intermediate modular reduction result B"; and
generating a result of the modular reduction calculation using the third intermediate modular reduction result B".

23. The method of claim 22, wherein the generating the result of the modular reduction calculation using the third intermediate modular reduction result B" comprises:
adding, word by word, a word of the third intermediate modular reduction result B" to a result of a logical AND of a respective word of the second number and a most significant word of the third intermediate modular reduction result B", generating a modular reduction value; and
generating a result of the modular reduction calculation using the modular reduction value.

24. The method of claim 22 wherein the cryptographic circuitry performs the modular reduction calculation using a determined number of steps which is independent of the first number.

25. The method of claim 22 wherein the first number represents an intermediate result of an elliptic curve group operation.

26. The method of claim 22 wherein the integer multiple is 4.

27. The method of claim 22, comprising:
authenticating a device coupled to the cryptographic circuitry, the authenticating including performing the cryptographic operation; and
enabling operation of the device based on the authenticating.

* * * * *